(12) United States Patent
Ludwig

(10) Patent No.: US 7,513,566 B2
(45) Date of Patent: Apr. 7, 2009

(54) HEADLINER STIFFENER WITH ENERGY ABSORBING MECHANISM

(75) Inventor: Adam Michael Ludwig, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 189 days.

(21) Appl. No.: 11/558,038

(22) Filed: Nov. 9, 2006

(65) Prior Publication Data

US 2007/0182216 A1     Aug. 9, 2007

Related U.S. Application Data

(60) Provisional application No. 60/765,591, filed on Feb. 6, 2006.

(51) Int. Cl.
*B60R 21/04* (2006.01)

(52) U.S. Cl. ............. 296/214; 296/187.03; 296/190.03; 280/751

(58) Field of Classification Search ............... 280/748, 280/751; 296/187.03, 190.03, 214
See application file for complete search history.

(56) References Cited

U.S. PATENT DOCUMENTS

| | | | | |
|---|---|---|---|---|
| 3,231,454 | A | * | 1/1966 | Williams ................. 428/132 |
| 3,904,223 | A | | 9/1975 | Wilfert et al. |
| 5,030,501 | A | * | 7/1991 | Colvin et al. ............. 428/178 |
| 5,082,716 | A | | 1/1992 | Satterfield et al. |
| 5,098,124 | A | * | 3/1992 | Breed et al. .............. 280/751 |
| 5,399,406 | A | * | 3/1995 | Matsuo et al. ............. 428/57 |
| 5,518,802 | A | * | 5/1996 | Colvin et al. ............. 428/178 |
| 5,823,611 | A | | 10/1998 | Daniel et al. |
| 5,833,304 | A | | 11/1998 | Daniel et al. |
| 6,036,227 | A | | 3/2000 | Lin et al. |
| 6,086,145 | A | * | 7/2000 | Wandyez ................. 296/214 |
| 6,120,090 | A | | 9/2000 | Van Ert et al. |
| 6,199,942 | B1 | | 3/2001 | Carroll, III et al. |
| 6,247,745 | B1 | | 6/2001 | Carroll, III et al. |
| 6,264,238 | B1 | | 7/2001 | MacDonald et al. |
| 6,315,350 | B1 | | 11/2001 | Nakane et al. |
| 6,397,553 | B1 | | 6/2002 | Horikawa et al. |
| 6,474,724 | B2 | | 11/2002 | Lemmon et al. |
| 6,475,937 | B1 | | 11/2002 | Preisler et al. |
| 6,520,568 | B2 | | 2/2003 | Von Holst et al. |
| 6,547,280 | B1 | * | 4/2003 | Ashmead ................. 280/751 |
| 6,588,557 | B2 | | 7/2003 | Williams et al. |
| 6,616,219 | B2 | | 9/2003 | Benkler |
| 6,652,021 | B1 | | 11/2003 | Dykman et al. |
| 6,679,544 | B1 | | 1/2004 | Hubbert et al. |
| 6,679,967 | B1 | | 1/2004 | Carroll, III et al. |
| 6,682,128 | B2 | * | 1/2004 | Carroll et al. .......... 296/187.03 |

(Continued)

FOREIGN PATENT DOCUMENTS

EP          57886  A1  *  8/1982

(Continued)

*Primary Examiner*—Glenn Dayoan
*Assistant Examiner*—Paul A Chenevert
(74) *Attorney, Agent, or Firm*—Gifford, Krass, Sprinkle, Anderson & Citkowski, P.C.

(57) ABSTRACT

An energy absorbent and stiffening assembly for an automotive headliner. The assembly includes at least one energy absorbent cone and at least one stiffening rib joined with and extending outwardly from the energy absorbent cone which stiffens the headliner.

16 Claims, 2 Drawing Sheets

U.S. PATENT DOCUMENTS

| | | | |
|---|---|---|---|
| 6,752,450 B2 * | 6/2004 | Carroll et al. | 296/187.03 |
| 6,942,076 B2 * | 9/2005 | Suzuki et al. | 188/371 |
| 7,249,662 B2 * | 7/2007 | Itou | 188/377 |
| 7,338,038 B2 * | 3/2008 | Maurer et al. | 267/144 |
| 7,384,095 B2 * | 6/2008 | Cormier et al. | 296/214 |
| 2002/0070584 A1 * | 6/2002 | Carroll et al. | 296/189 |
| 2002/0074828 A1 | 6/2002 | Benkler | |
| 2005/0040679 A1 * | 2/2005 | Lipke et al. | 296/214 |
| 2005/0052010 A1 * | 3/2005 | Best et al. | 280/751 |
| 2005/0127718 A1 * | 6/2005 | Cormier et al. | 296/214 |
| 2007/0046073 A1 * | 3/2007 | Ludwig et al. | 296/214 |

FOREIGN PATENT DOCUMENTS

JP      01060470 A * 3/1989

* cited by examiner

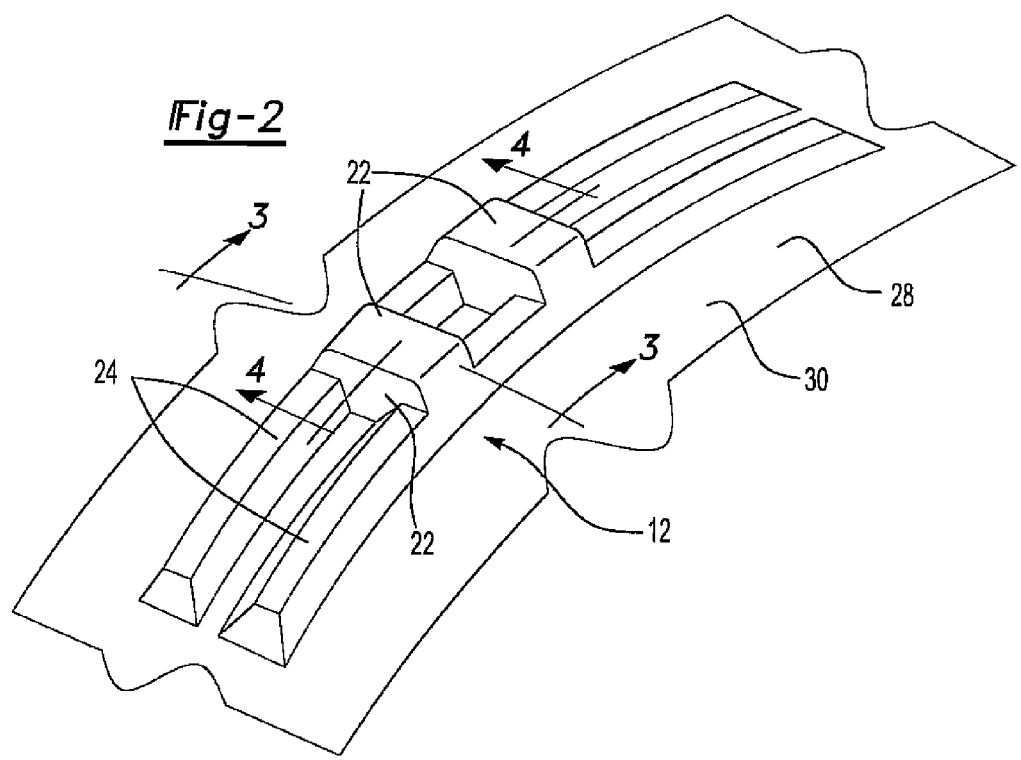
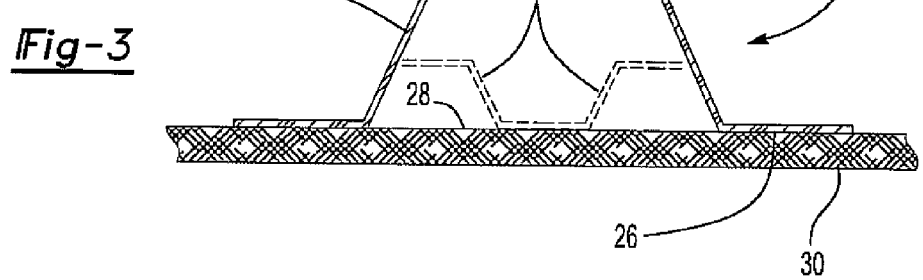
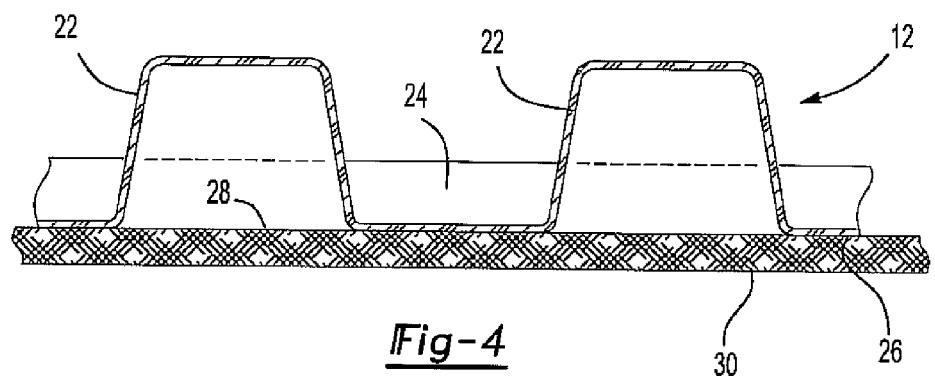

HEADLINER STIFFENER WITH ENERGY ABSORBING MECHANISM

RELATED APPLICATION

This application claims priority of U.S. Provisional Patent Application Ser. No. 60/765,591 filed Feb. 6, 2006, which is incorporated herein by reference.

BACKGROUND OF THE INVENTION

I. Field of the Invention

The present invention relates to a combination energy absorbent and stiffening assembly for an automotive headliner.

II. Description of Related Art

Modern automotive vehicles conventionally include a headliner which is secured to the roof across the top of the passenger compartment. In order to protect the occupants of a vehicle in the event of a crash, such headliners oftentimes include energy absorbent cones disposed above the pillar garnishes. In the event of a head impact to the energy absorbent cones, the cones collapse and, in doing so, absorb the impact energy thereby lessening the possibility of serious bodily injury.

Conventionally, the energy absorbent cones were glued or otherwise attached to the headliner prior to assembly of the headliner in the automotive vehicle. Such energy absorbent cones, however, are relatively stiffer than the headliner so that the headliner frequently became creased, torn or otherwise damaged during the handling and installation of the headliner.

SUMMARY OF THE PRESENT INVENTION

The present invention provides an energy absorbent and stiffening assembly for an automotive headliner which overcomes all of the above-mentioned disadvantages of the previously known devices.

In brief, the assembly of the present invention includes at least one and preferably two energy absorbent cones. These cones may be of any conventional construction which allows the cones to collapse upon impact thus absorbing the force of the impact. Such cones are typically a thin-walled structure.

At least one elongated stiffening rib is joined to and extends outwardly from at least one of the cones. This rib may extend between adjacent cones as well as axially outwardly from one or both cones along a front-to-rear axis of the vehicle.

The energy absorbent cones and stiffening ribs are of a one-piece construction and are attached to a headliner for the automotive vehicle in any conventional fashion, such as by an adhesive. Once attached to the headliner, the stiffening ribs protect the headliner from damage during handling and installation.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 2 is a fragmentary elevational view illustrating one embodiment of the present invention;

FIG. 3 is a sectional view taken substantially along line 3-3 in FIG. 2; and

FIG. 4 is a sectional view taken along line 4-4 in FIG. 2.

DETAILED DESCRIPTION OF AN EMBODIMENT OF THE PRESENT INVENTION

Figure 1:
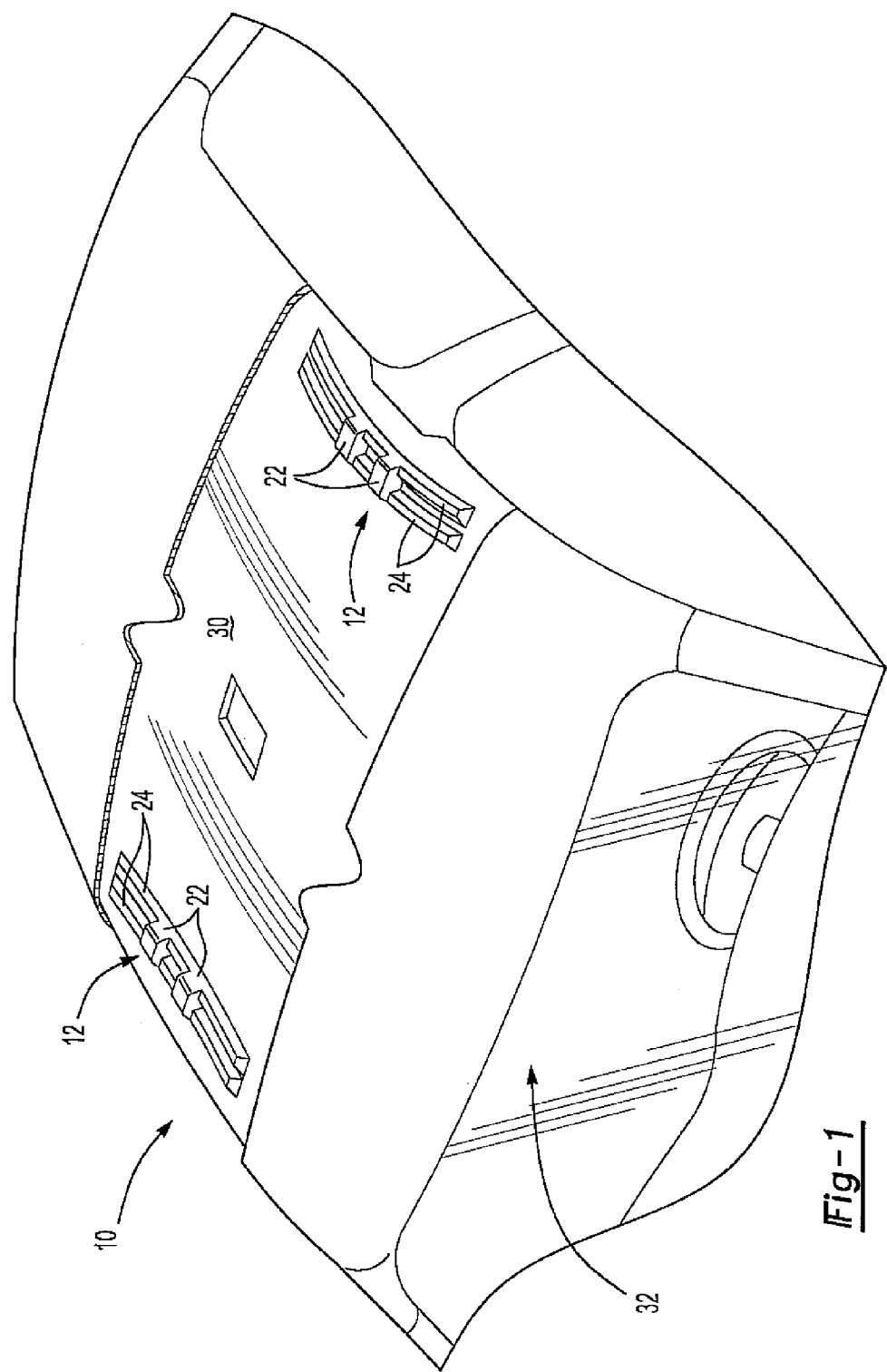
FIG. 1 is a fragmentary and partial sectional elevational view illustrating an embodiment of the present invention installed in a vehicle.

With reference first to FIG. 1, a fragmentary diagrammatic view of an automotive vehicle 10 is illustrated in which a preferred embodiment of the energy absorbing and stiffening assembly 12 of the present invention is shown. One assembly 12 is positioned above the vehicle central pillar garnish on each lateral side of the automotive vehicle 10. The assembly 12 is located above a headliner 30 which extends across the top of the passenger compartment 32 of the vehicle 10.

With reference now particularly to FIGS. 2-4, the assembly 12 is there shown in greater detail and includes one or more energy absorbing cones 22 which are positioned side by side and spaced slightly apart from each other along a front-to-rear axis of the vehicle 10. Each energy absorbing cone 22 is formed from a deformable material so that, upon a head impact, the energy absorbing cones 22 will deform and reduce the peak impact force in the desired fashion thereby lessening the possibility of serious injury to the vehicle occupant in the event of a crash.

With reference now particularly to FIGS. 3-4, although any conventional construction may be utilized for the energy absorbing cone 22, preferably the energy absorbing cone 22 comprises a thin-walled structure which is generally rectangular in cross section.

Referring again to FIGS. 2-4, the energy absorbing and stiffening assembly 12 further includes a plurality of elongated stiffening ribs 24 which extend forwardly, rearwardly and in between the energy absorbing cones 22. The stiffening ribs 24, furthermore, are of a one-piece construction with the energy absorbing cones 22. Preferably, the energy absorbing cones 22 and stiffening ribs 24 are formed by molding or otherwise forming a synthetic polymeric material such as polypropylene.

With reference now particularly to FIG. 3, each stiffening rib 24, like the energy absorbing cones 22, is of a thin-walled construction for reduced weight. Each stiffening rib 24, furthermore, is substantially trapezoidal in cross-sectional shape. Such a trapezoidal shape enhances the structural strength of each rib 24 while minimizing its weight.

A bottom 26 of each stiffening rib 24 is generally flush with a bottom of the energy absorbing cones 22. Additionally, the overall shape of a lower surface of the stiffening ribs 24 and energy absorbing cones 22 generally conforms with an upper surface 28 of the vehicle headliner 30.

In operation, one energy absorbing and stiffening assembly 12 is attached to the upper surface 28 of the headliner 30 on each lateral side of the headliner 30 so that the assembly 12 is positioned above and closely adjacent to a pillar garnish 30 on each side of the vehicle 10. Preferably, the assembly 12 is adhesively secured to the top 28 of the headliner 30 although other means may be used to attach the assembly 12 to the headliner 30 without deviation from the spirit or scope of the invention.

With the energy absorbing and stiffening assembly 12 attached to each lateral side of the vehicle headliner, the stiffening ribs 24 maintain the integrity of the shape of the headliner 30 during handling and assembly of the headliner 30 into the vehicle 10. As such, the assembly 12 effectively protects the headliner 30 from cracking, tearing or creasing during handling of the headliner 30. Furthermore, once the headliner 30 with the attached assemblies 12 are installed in the automotive vehicle 10, the energy absorbing cones 22 function in their conventional manner to protect vehicle occupants from serious injury in the event of a head impact above the pillar garnish.

From the foregoing, it can be seen that the present invention provides a simple and yet effective energy absorbing and stiffening assembly which both protects the headliner 30 from damage during handling and installation, and simultaneously provides the head impact protection above the pillar garnishes. Having described my invention, however, many modifications thereto will become apparent to those skilled in the art to which it pertains without deviation from the spirit of the invention as defined by the scope of the appended claims.

I claim:

1. An energy absorbent and stiffening assembly for an automotive headliner comprising:
   at least one energy absorbent cone, and
   at least one pair of stiffening ribs including a first stiffening rib and a separate second stiffening rib,
   wherein said first stiffening rib is substantially parallel to said second stiffening rib,
   wherein said first stiffening rib is directly connected to said second stiffening rib,
   wherein said pair of stiffening ribs are joined with and extending outwardly from said cone, and
   wherein said cone and said pair of stiffening ribs are capable of being secured to the headliner.

2. The invention as defined in claim 1 wherein each rib comprises a thin wall structure having a trapezoidai cross-sectional shape.

3. The invention as defined in claim 1 wherein said cone and said pair of ribs are of a one-piece construction.

4. The invention as defined in claim 3 wherein said cones and all of said stiffening ribs comprise polypropylene.

5. The invention as defined in claim 1 wherein said at least one energy absorbent cone comprises a front and a rear cone spaced apart from each other and wherein said pair of stiffening ribs extends longitudinally between said cones.

6. The invention as defined in claim 5 and comprising at least two further stiffening ribs, one of said further ribs extending forwardly from said front cone and the other of said further ribs extending rearwardly from said rear cone.

7. The invention as defined in claim 5 and comprising a further pair of laterally spaced stiffening ribs extending rearwardly from said rear cone.

8. The invention as defined in claim 7 wherein each rib of said further pair of laterally spaced stiffening ribs comprises a thin wall structure.

9. The invention as defined in claim 5 and comprising a further a pair of lateraily spaced stiffening ribs extending forwardly from said front cone.

10. The invention as defined in claim 9 wherein each rib of said further pair of laterally spaced stiffening ribs comprises a thin wall structure.

11. A headliner assembly comprising:
   a headliner dimensioned to cover at least a portion of a top of an automotive passenger compartment,
   an energy absorbent and stiffening structure attached to said headliner, said energy absorbent and stiffening structure having at least one energy absorbent cone and at least one pair of stiffening ribs extending longitudinally outwardly from said at least one cone,
   wherein said pair of stiffening ribs includes a first stiffening rib and a second stiffening rib,
   wherein said first stiffening rib is substantially parallel to said second stiffening rib, and
   wherein said first stiffening rib is directly connected to said second stiffening rib.

12. The invention as defined in claim 11 wherein said energy absorbent and stiffening structure is a one-piece construction.

13. The invention as defined in claim 12 wherein said energy absorbent and stiffening structure comprises polypropylene.

14. The invention as defined in claim 11 wherein said energy absorbent and stiffening structure further comprises front and rear spaced apart energy absorbent cones, said pair of stiffening ribs extending between said cones.

15. The invention as defined in claim 14 wherein said energy absorbent and stiffening structure further comprises a further pair of stiffening ribs extending forwardly from said front cone.

16. The invention as defined in claim 14 wherein said energy absorbent and stiffening structure further comprises a further pair of stiffening ribs extending rearwardly from said rear cone.

* * * * *